United States Patent [19]

Hefner, Jr.

[11] 4,360,647

[45] Nov. 23, 1982

[54] PHOSPHONATE TERMINATED DICYCLOPENTADIENE MODIFIED POLYESTERS

[75] Inventor: Robert E. Hefner, Jr., Lake Jackson, Tex.

[73] Assignee: The Dow Chemical Company, Midland, Mich.

[21] Appl. No.: 283,316

[22] Filed: Jul. 14, 1981

[51] Int. Cl.$^3$ .................... C08F 283/02; C08G 63/68; C08G 63/54

[52] U.S. Cl. .................................. 525/445; 528/287; 528/298; 528/299; 528/304; 525/437

[58] Field of Search ............... 525/437, 445; 528/287, 528/298, 299, 304

[56] References Cited

U.S. PATENT DOCUMENTS

| | | | |
|---|---|---|---|
| 3,412,070 | 11/1968 | Jakob et al. ........................... | 528/299 |
| 3,575,927 | 4/1971 | Jackson et al. ...................... | 528/298 |
| 4,029,848 | 6/1977 | Nelson ................................. | 428/430 |
| 4,035,343 | 6/1977 | Bollert et al. ....................... | 528/287 |
| 4,117,030 | 9/1978 | Nelson .............................. | 260/837 R |
| 4,167,542 | 9/1979 | Nelson ................................ | 525/545 |
| 4,233,432 | 11/1980 | Curtis ................................. | 528/298 |
| 4,246,367 | 1/1981 | Curtis ................................. | 525/49 |

FOREIGN PATENT DOCUMENTS 1195902 6/1970 United Kingdom .

OTHER PUBLICATIONS

Boenig–Unsaturated Polyesters: Structure and Properties, Elsevier, London (1964), pp. 181 $\propto$ 182.

Primary Examiner—H. S. Cockeram

[57] ABSTRACT

Unsaturated polyesters modified with a norbornene functional compound, such as dicyclopentadiene, and containing a phosphonate group cure into fire retardant plastics.

24 Claims, No Drawings

PHOSPHONATE TERMINATED DICYCLOPENTADIENE MODIFIED POLYESTERS

BACKGROUND OF THE INVENTION

Unsaturated polyesters find extensive utility in a wide variety of applications. Being essentially organic in nature such polyesters are all combustible to greater or lesser extent. Many different approaches and techniques have been developed to improve the resistance of polyesters to ignition or to propagation of flame. Typical are the use of inorganic fillers, organic fire retardants, and the chemical modification of the diacid, the diol or the reactive diluent employed.

In recent years there has been developed a class of dicyclopentadiene modified unsaturated polyesters. These polyesters have a unique spectrum of properties, but, as expected, are combustible. One technique employed to improve their fire resistance is to brominate the pendant cyclopentene double bond of the dicyclopentadiene in the polyester. That generally results in less than the necessary amount of bromine for many applications. It has been found that the necessary bromine can be incorporated by including a brominated reactive diluent such as dibromodicyclopentadiene acrylate. However, that requires a separate bromination step.

In copending patent application U.S. Ser. No. 283,315 filed July 14, 1981 there is described a process whereby dicyclopentadiene acrylate or its equivalent could be blended with the dicyclopentadiene modified unsaturated polyester and both components brominated to the desired extent without causing bromination of the other parts of the molecule.

SUMMARY OF THE INVENTION

Dicyclopentadiene modified unsaturated polyesters having at least one alkoxyalkyl phosphonate terminal group are novel resin compositions that are well adapted for a variety of uses.

DETAILED DESCRIPTION OF THE INVENTION

Unsaturated polyesters are prepared by methods known in the art. Typically, an $\alpha,\beta$-unsaturated polycarboxylic acid, anhydride or mixture thereof, usually a dicarboxylic acid, dicarboxylic acid anhydride or mixture thereof, is condensed with a polyhydric alcohol or a mixture of polyhydric alcohols, typically a saturated diol. Many variations are possible. For example, part of the unsaturated dicarboxylic acid may be replaced by a saturated dicarboxylic acid and/or a halogenated saturated or unsaturated dicarboxylic acid. The anhydrides of such acids are commonly employed in the preparation of the polyesters. Also, the dihydric alcohol may be unsaturated in whole or in part. The dihydric alcohol may also contain halogen, as for example, dibromoneopentyl glycol.

The $\alpha,\beta$-unsaturation derived from such $\alpha,\beta$-unsaturated diacids becomes a part of the polymer chains and is used in the curing of the resin through cross-linking with a monomer. Such unsaturation is generally undesirable to substitute and, when substituted, e.g., halogenated, the curability and properties of the polyester are altered. Other unsaturated polyesters useful in the present invention are those containing that polymer chain $\alpha,\beta$-unsaturation and, in addition, containing pendant unsaturation. By the term "pendant unsaturation" is meant olefinic unsaturation that is not from the $\alpha,\beta$-unsaturated entities of the polyester or the $\alpha,\beta$-unsaturated dicyclopentadienyl ester, when used. The pendant unsaturation is not conjugated with carboxyl groups and is not present in the polyester for the purpose of curing into the final product.

Useful classes of unsaturated polyesters are those which have been modified with DCPD and/or other cycloalkylenically unsaturated compounds, such as carbic anhydride or tetrahydrophthalic anhydride.

A class of unsaturated polyesters modified with dicyclopentadiene is a preferred structure onto which the phosphonate group is attached. Such polyesters can be prepared in a variety of techniques. A preferred method, which for purposes of this application is called the hydrolysis method, involves the hydrolysis of a portion of maleic anhydride with a fraction of equivalent of water at an elevated temperature of from about 60° to 130° C. A second fractional equivalent of water and of dicyclopentadiene (DCPD) id added, followed at intervals of additional fractional equivalents of DCPD until the desired amount of DCPD has been added. The temperature is raised to complete the reaction. The product is principally DCPD monomaleate plus maleic acid and maleic anhydride. To that mix is added a glycol and the polyesterification carried out in a usual manner. The result is an unsaturated polyester having pendant dicyclopentadienyl groups.

Many other embodiments of the hydrolysis method are useful. In an alternate embodiment, all of the maleic anhydride is hydrolyzed followed by addition of all or increments of the DCPD. Also all of the water and maleic acid or anhydride or mixtures thereof may be mixed and slowly heated to achieve the hydrolysis.

In another alternate, but less preferred embodiment, the DCPD, maleic anhydride, glycol and water are reacted simultaneously to produce a polyester.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

These concentrates have as the main reactive components about 60 to about 90 percent by weight of dicyclopentadiene, about 5 to about 30 percent by weight of the mixed Diels-Alder dimers of diolefins such as butadiene, cis and trans piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

Either the $C_{10}$ concentrate or the relatively pure DCPD may be employed in preparing the modified polyesters.

Similar pendant unsaturation, can be inserted into a polyester by employing tetrahydrophthalic anhydride as a part of the dicarboxylic function. In such instance that anhydride, an unsaturated dicarboxylic acid and a glycol are cooked together by conventional polyester preparation techniques.

A similar result is obtained when carbic anhydride is employed as part of the diacid in making the polyester.

The carbic anhydride may be generated in situ by the thermal cracking of DCPD. Methyl carbic anhydride is also useful.

Other techniques are known for modifying unsaturated polyesters to obtain such products having pendant cycloalkylenic unsaturation. A number of such techniques are taught in British Pat. No. 1,195,902 wherein the DCPD is included in the polyester through etherification as well as esterification.

The useful unsaturated polyesters of this invention are those described above which have been further modified with a phosphonate terminal group. These polyesters are conveniently prepared by reacting the modified polyester, wherein one or both ends are hydroxyl terminated, with a dialkoxyalkyl phosphonate, such as dimethoxymethyl phosphonate, with a catalyst, such as dibutyltin oxide and with the removal of methanol. The product is a monomethoxymethyl phosphonate terminated unsaturated polyester. The phosphonate terminated unsaturated polyesters of this invention can be halogenated to produce unsaturated polyesters containing halogen groups at some or all of the former sites of pendant unsaturation. Such phosphonate groups improve the resistance of the polyesters to flame propagation and also reduce the volume of smoke produced when ignited.

In a preferred embodiment, the phosphonate terminated unsaturated polyesters are blended with a comparatively lower viscosity DCPD monounsaturated ester. That ester is DCPD acrylate; DCPD methacrylate; DCPD alkylenoxyacrylate or bis(DCPD)fumarate. This ester lowers the viscosity of the blend and provides polymerization sites and pendant unsaturation for simultaneous and selective cohalogenation of ester and polyester.

It is desirable to add a vinyl polymerization inhibitor, such as hydroquinone, methyl ether of hydroquinone, t-butylcatechol or other known inhibitor. That inhibitor may be added by dissolving the inhibitor in a small amount of styrene or, more preferably, the inhibitor may be added followed by the styrene. It may also be of advantage to add an oxirane compound, such as an epoxide or a polyepoxide, as a hydrohalide scavenger to aid in stabilization of the blend.

The reaction is then allowed to warm to room temperature and the solvent, if any be used, removed as by distillation under reduced pressure or by other known technique.

The polyester may be diluted with a vinyl monomer, such as styrene, vinyl toluene, acrylate esters or other known monovinyl monomer, to result in viscosity reduction and greater cross-linking potential. Such monomers are commonly called reactive diluents.

The reactive diluent is then added and mixed thoroughly with the cohalogenated unsaturated polyester/ester blend.

The following examples illustrate the inventive concept and describe the best mode for carrying out the invention.

In the examples DCPD is dicyclopentadiene and DCPD-A is dicyclopentadiene acrylate.

By DCPD-A (monomer grade) is meant a distilled product containing greater than 99 percent DCPD-A with a trace of DCPD-diacrylate and a trace of $C_{15}$ and $C_{20}$ acrylates. By DCPD-A (undistilled) is meant a product of about 95 percent DCPD-A plus about 2 percent DCPD-diacrylate, 3 percent $C_{15}$ and $C_{20}$ acrylates and a trace of acrylic polymers.

EXAMPLE 1

(a) A polyester was prepared by first reacting 2.4 moles of 98 percent DCPD with 3.8 moles maleic anhydride and 2.8 moles water. The reaction is carried out by melting the maleic anhydride at 70° C., adding ¾ of the water and then about 2 minutes later, adding a quarter of the amount of DCPD. After about 20 minutes a second quarter of the DCPD is added with the remainder of the water. The remaining DCPD is added in 2 equal amounts at 15 minute intervals after which the reactor is heated to 110° C. and maintained for 30 minutes.

That DCPD monomaleate, excess maleic anhydride and maleic acid mixture is reacted with 3.12 moles propylene glycol and heated at 160° C. with removal of water for 2 hours, followed by 205° C. to an acid number of 36. The reaction was cooled to 160° C. and 0.1 percent dibutyltin oxide was added followed by 0.2 mole dimethoxymethyl phosphonate. The reaction was carried out 1 hour at 160° C. with removal of methanol. The temperature was increased until 185° C. was reached and the acid number was 33.

To 317.39 grams polyester was added 49.19 grams DCPD-A (monomer grade) and 1500 milliliters methylene chloride. The solution was chilled to minus 20° C. and held under nitrogen. There was added 166.33 grams bromine dropwise over 74 minutes and post reacted at reduced temperature for one hour. The inhibitor-stabilizer combination was added followed by 190.25 grams styrene.

(b) A nonbrominated formulation was prepared to include 57 percent of the phosphonate end-capped polyester, 8.83 percent DCPD-A and 34.17 percent styrene.

The compositions of the invention were tested by conventional procedures to determine various physical and chemical properties.

The Brookfield viscosity was measured at room temperature.

Heat distortion bars were cured at room temperature with 0.1 percent cobalt naphthenate (6 percent); 1.0 percent methylethylketone peroxide and 0.02 percent dimethylaniline. The bars were post cured for 2 hours at 93° C.

Unfilled, clear castings for tensile and flexural strength evaluations were made with a cure system of 1.0 percent benzoyl peroxide and 0.01 percent dimethylaniline cured at room temperature followed by a 2 hour post cure at 93° C.

In the following table:
Br$_2$ is in moles.
Viscosity is Brookfield viscosity in cps at 25° C.
HDT is heat distortion temperature in degrees F.
Tensile strength is psi $\times 10^3$.
Elongation is in percentage.
Flexural strength is psi $\times 10^4$.

TABLE I

| Example | Br₂ | Viscosity | HDT | SPI Gel - 84° C. Gel time | SPI Gel - 84° C. Cure time | SPI Gel - 84° C. Max. Exotherm | Barcol Hardness | Tensile Strength | Elong. | Flexural Strength |
|---|---|---|---|---|---|---|---|---|---|---|
| 1(a) | 1.04 | 195 | 178 | 5.8 | 8.4 | 165 | 46.7 | 3.336 | 0.46 | 0.7008 |
| 1(b) | — | 35 | 189 | 8.5 | 11.4 | 218 | 45.6 | 3.608 | 0.77 | 0.8048 |

In the table, it is noted that the viscosity of the brominated embodiment is higher than the nonbrominated equivalent.

The heat distortion temperature shows a significant difference between brominated and nonbrominated species. In the other properties of Barcol hardness, tensile strength, flexural strength and elongation, the values of the brominated and nonbrominated compositions are similar. Similar results are obtained when undistilled DCPD-A is employed in place of the monomer grade DCPD-A.

Oxygen index, (OI), values were determined by ASTM D2863-76 for the compositions of Example 1. The results are in Table II.

TABLE II

| Example | Br₂ | OI |
|---|---|---|
| 1(a) | 1.04 | >38.20 |
| 1(b) | — | ATM |

The nonbrominated, unsaturated polyester possessed an atmospheric OI value indicative of the total combustion in ambient air. The brominated composition of Example 1 has a significantly enhanced OI value indicating the function of the phosphorus end cap together with the bromine substitution.

The nonbrominated compositions of 1(b) burned with black smoke without leaving a residue. That of Example 1(a) burned with reduced smoke and was extinguished by thick ash formations at values below the OI.

EXAMPLE 2

(a) A polyester was prepared according to the procedure of Example 1 using, in place of the stated ingredients of that example, 7.6 moles of maleic anhydride, 4.8 moles of a DCPD concentrate (containing 0.52 percent lights, 16.84 percent codimers, 82.60 percent DCPD, 0.04 percent trimers) and 5.6 moles water. A mixture of 2.08 moles diethylene glycol and 4.16 moles ethylene glycol was used. After reaction with ethylene and diethylene glycol, 0.1 percent dibutylin oxide was added followed by 0.4 mole dimethoxymethyl phosphonate. The final acid number was 28.

To 382.35 grams polyester was added 65.20 grams undistilled DCPD-A and 1100 milliliters methylene chloride. The solution was chilled to minus 20° C. and held under nitrogen. There was added 200.37 grams bromine dropwise over 37 minutes and post reacted at reduced temperatures for one hour. The inhibitor-stabilizer combination was added followed by 223.24 grams styrene.

(b) A nonbrominated formulation was prepared from 57 percent of the polyester, 9.72 percent of the undistilled DCPD-A and 33.28 percent styrene.

(c) A brominated polyester formulation was prepared. To 382.35 grams of the polyester was added 1150 milliliters methylene chloride. The solution was chilled to minus 20° C. and held under nitrogen. There was added 153.43 grams bromine dropwise over 47 minutes and post reacted at reduced temperature for 1 hour. The inhibitor-stabilizer combination was added followed by 288.44 grams styrene.

EXAMPLE 3

(a) A polyester was prepared by reacting 3.6 moles of 98 percent DCPD with 5.7 moles maleic anhydride and 4.2 moles water. The reaction is carried out by heating the maleic anhydride to 170° C. followed by the addition of 0.30 mole DCPD after which the reactor is heated to 180° C. and held for 30 minutes then cooled to 70° C. Three fourths of the water was added to the reactor and then about 2 minutes later, a quarter of the amount of DCPD. After about 20 minutes, a second quarter of the DCPD is added with the remainder of the water. The remaining DCPD is added in two equal amounts at 15 minute intervals after which the reactor is heated to 110° C. and maintained for 30 minutes.

That DCPD monomaleate, carbic anhydride and acid plus the excess maleic anhydride and maleic acid mixture is reacted with 2.34 moles propylene glycol and 2.34 moles dipropylene glycol and heated at 160° C. with removal of the water for 2 hours, followed by 205° C. to an acid number of 32. After reaction with the propylene glycol and dipropylene glycol, the reaction was cooled to 160° C. and 0.1 percent dibutyltin oxide added then 0.3 mole dibutyloxy butyl phosphonate. The reaction was carried out one hour at 160° C. with removal of butanol. The temperature was increased until 185° C. was reached and the final acid number was 30.

To 400.29 grams polyester was added 74.94 grams undistilled DCPD-A and 1450 milliliters methylene chloride. The solution was chilled to minus 20° C. and held under nitrogen. There was added 209.77 grams bromine dropwise over 43 minutes and post reacted at reduced temperature for one hour. The inhibitor-stabilizer combination was added followed by 227.03 grams styrene.

(b) A nonbrominated formulation was prepared from 56 percent of the polyester, 10.67 percent of the undistilled DCPD-A and 32.33 percent styrene.

(c) A brominated polyester formulation was prepared. To 400.29 grams polyester was added 1500 milliliters methylene chloride. The solution was chilled to minus 20° C. and held under nitrogen. There was added 155.82 grams bromine dropwise over 42 minutes and post reacted at reduced temperature for 1 hour. The inhibitor-stabilizer combination was added followed by 301.97 grams styrene.

EXAMPLE 4

Each of the compositions of Examples 2 and 3 and the nonbrominated formulations and brominated polyester formulations were tested according to the procedure of Example 1. The results are in Table III.

TABLE III

| Example | Br$_2$ | Viscosity | HDT | SPI Gel - 84° C. Gel Time | SPI Gel - 84° C. Cure Time | SPI Gel - 84° C. Max. Exotherm | Barcol Hardness | Tensile Strength | Elong. | Flexural Strength |
| --- | --- | --- | --- | --- | --- | --- | --- | --- | --- | --- |
| 2(a) | 1.254 | 308 | 139 | 4.0 | 7.8 | 138 | 35.6 | 5.285 | 4.2 | 0.9551 |
| 2(b) | — | 62 | 160 | 4.5 | 7.2 | 206 | 39.7 | 6.538 | 2.5 | 1.6129 |
| 2(c) | 0.96 | 78 | 138 | 4.2 | 10.3 | 128 | 10.3 | 2.216 | >10.0 | 0.4924 |
| 3(a) | 1.313 | 191 | 143 | 5.6 | 10.4 | 142 | 14.9 | 5.650 | 8.1 | 0.5148 |
| 3(b) | — | 48 | 163 | 5.5 | 9.6 | 192 | 41.4 | 6.833 | 1.6 | 1.0938 |
| 3(c) | 0.975 | 66 | 152 | 5.5 | 11.0 | 144 | 12.5 | 3.128 | >10.0 | 0.4445 |

EXAMPLE 5

Oxygen Index (OI) values (ASTM D2863-76) were determined for the compositions of Examples 2 and 3. The results are in Table IV.

TABLE IV

| Example | Br$_2$ | OI |
| --- | --- | --- |
| 2(a) | 1.254 | >38.20 |
| 2(b) | — | ATM |
| 2(c) | 0.96 | 37.40 |
| 3(a) | 1.313 | 30.25 |
| 3(b) | — | ATM |
| 3(c) | 0.975 | 27.75 |

All of the nonbrominated polyesters possessed atmospheric OI values indicative of the total combustion in ambient air. All brominated polyester compositions of Examples 2(c) and 3(c) possessed significantly lower OI values than their cobriminated counterparts of Examples 2(a) and 3(a) reflecting their lower percent bromine substitution.

The nonbrominated compositions of Examples 2(b) and 3(b) all burned with black smoke without leaving a residue. Those of Example 2(a) and 3(a) burned with reduced smoke and were extinguished by thick ash formation at values below the OI.

EXAMPLE 6

Fifty-seven percent of the polyester alkyd of Example 2 was formulated with 14.33 percent of distilled dichlorodicyclopentadiene acrylate and 28.67 percent styrene. This formulation was used to prepare clear castings as described in Example 1 for use in mechanical/physical property evaluations, with the following results:

| | |
| --- | --- |
| Brookfield Viscosity (cp) 25° C. | 180 |
| HDT (°F.) | 122 |
| SPI gel time (min.) | 5.3 |
| SPI cure time (min.) | 8.5 |
| SPI maximum exotherm (°C.) | 172 |
| Average Barcol Hardness | 46.1 |
| Tensile Strength × 10$^3$ (psi) | 8.266 |
| Elongation (%) | 2.79 |
| Flexural Strength × 10$^4$ (psi) | 1.4386 |
| Oxygen Index | 22.25 |

What is claimed is:

1. A curable unsaturated polyester resin of an α,β-unsaturated polycarboxylic acid, anhydride or mixture thereof and a polyol or mixture of polyols, said polyester having pendant unsaturation and having at least one end terminated by an alkoxyalkyl phosphonate.

2. The polyester resin of claim 1 wherein said α,β-unsaturated polycarboxylic acid is an α,β-unsaturated dicarboxylic acid and said polyol is a diol or mixture.

3. The polyester resin of claim 2 wherein said diacid is maleic acid or anhydride or fumaric acid or a mixture thereof and said diol is an aliphatic glycol or mixtures of aliphatic glycols.

4. The polyester resin of claim 1 wherein said polyester is modified with a norbornene functional compound.

5. The polyester resin of claim 4 wherein said norbornene functional compound is dicyclopentadiene, dicyclopentadiene concentrate or a mixture thereof.

6. The polyester resin of claim 1 containing carbic acid or anhydride or a mixture thereof.

7. The polyester resin of claim 1 containing tetrahydrophthalic acid or anhydride or a mixture thereof.

8. The polyester resin of claim 1 wherein said phosphonate is dimethoxymethyl phosphonate.

9. The polyester resin of claim 1 wherein said phosphonate is dibutoxybutyl phosphonate.

10. The polyester resin of claim 1 wherein both ends are terminated by said dialkoxyalkyl phosphonate.

11. The polyester resin of claim 1 wherein halogen is added to at least a part of the sites of said pendant unsaturation.

12. The polyester resin of claim 11 wherein essentially all of said sites are halogenated.

13. The polyester resin of claim 11 wherein said halogen is bromine.

14. The polyester resin of claim 11 wherein said halogen is chlorine.

15. A curable composition comprising said polyester of claim 1 and a dicyclopentadienyl ester of an α,β-unsaturated carboxylic acid.

16. The composition of claim 15 wherein said ester is dicyclopentadienyl acrylate.

17. The composition of claim 16 wherein said ester is undistilled dicyclopentadienyl acrylate.

18. The composition of claim 14 wherein said ester is dicyclopentadienyl methacrylate.

19. The composition of claim 14 wherein said ester is dicyclopentadienyl alkyleneoxyalkyl acrylate.

20. The composition of claim 14 wherein said ester is bis(dicyclopentadienyl) fumarate.

21. The composition of claim 14 wherein said unsaturated polyester is halogenated.

22. The composition of claim 21 wherein the halogen is bromine.

23. The composition of claim 21 wherein the halogen is chlorine.

24. A cured composition of the polyester resin claimed in claim 1.

* * * * *